(12) United States Patent
Kamagata

(10) Patent No.: US 12,472,706 B2
(45) Date of Patent: Nov. 18, 2025

(54) IDENTIFICATION DEVICE, IDENTIFICATION METHOD, AND IDENTIFICATION PROGRAM FOR IDENTIFYING FIBER LAYER IN FIBER-REINFORCED MATERIAL

(71) Applicant: IHI Corporation, Tokyo (JP)

(72) Inventor: Takanori Kamagata, Tokyo (JP)

(73) Assignee: IHI Corporation, Tokyo (JP)

(*) Notice: Subject to any disclaimer, the term of this patent is extended or adjusted under 35 U.S.C. 154(b) by 350 days.

(21) Appl. No.: 18/166,596

(22) Filed: Feb. 9, 2023

(65) Prior Publication Data

US 2023/0191727 A1 Jun. 22, 2023

Related U.S. Application Data

(63) Continuation of application No. PCT/JP2021/032693, filed on Sep. 6, 2021.

(30) Foreign Application Priority Data

Dec. 28, 2020 (JP) .................................. 2020-218938

(51) Int. Cl.
  B29C 70/54 (2006.01)
  B29C 70/22 (2006.01)
  (Continued)

(52) U.S. Cl.
  CPC ............ B29C 70/54 (2013.01); B29C 70/228 (2013.01); G01N 23/046 (2013.01);
  (Continued)

(58) Field of Classification Search
  CPC ............ G01N 23/046; G01N 33/0003; G01N 33/0078; G01N 2223/402; G01N 2223/41;
  (Continued)

(56) References Cited

U.S. PATENT DOCUMENTS 5,490,426 A * 2/1996 Shiga .................. G01L 1/24
                                                73/762
2012/0312459 A1 12/2012 De Mattia
(Continued)

FOREIGN PATENT DOCUMENTS

CN   111832570 A   10/2020
EP   3 054 286 A1   8/2016
(Continued)

OTHER PUBLICATIONS

International Search Report issued Nov. 16, 2021 in PCT/JP2021/032693 filed on Sep. 6, 2021, 2 pages.
(Continued)

*Primary Examiner* — Helen C Kwok

(74) *Attorney, Agent, or Firm* — Oblon, McClelland, Maier & Neustadt, L.L.P.

(57) ABSTRACT

Regarding to a fiber-reinforced material formed by deforming a reinforcing material composed of a plurality of fiber layers from an initial shape and molding into a predetermined shape, an identification device, an identification method, and an identification program generate a first data in which a physical quantity distribution inside the fiber-reinforced material is mapped to the initial shape, perform binarization of the first data to generate a second data in which a label identifying the fiber layer is mapped to the initial shape, and map the second data to a predetermined shape, based on a deformation data.

6 Claims, 3 Drawing Sheets

(51) Int. Cl.
*G01N 23/046* (2018.01)
*G01N 33/00* (2006.01)
*G06T 7/00* (2017.01)

(52) U.S. Cl.
CPC ..... *G01N 33/0003* (2024.05); *G01N 33/0078* (2024.05); *G06T 7/0004* (2013.01)

(58) Field of Classification Search
CPC ....... G01N 2223/419; G01N 2223/615; G01N 2223/645; B29C 50/54; B29C 70/228; B29C 70/50; G06T 7/0004
See application file for complete search history.

(56) References Cited

U.S. PATENT DOCUMENTS

| | | | |
|---|---|---|---|
| 2015/0158271 A1* | 6/2015 | Hoshino | C08J 5/043 442/104 |
| 2015/0273366 A1* | 10/2015 | Takashima | D01D 5/0084 210/489 |
| 2016/0247271 A1* | 8/2016 | Hishida | G06T 7/0004 |
| 2017/0213357 A1 | 7/2017 | Hishida et al. | |
| 2018/0222128 A1* | 8/2018 | Tomioka | B29C 43/48 |
| 2019/0040553 A1* | 2/2019 | Hishida | D03D 11/00 |
| 2019/0118508 A1* | 4/2019 | Saito | C08J 5/245 |
| 2019/0317027 A1 | 10/2019 | Tsuboi et al. | |
| 2021/0116434 A1* | 4/2021 | De Beenhouwer | G01N 23/046 |
| 2022/0130082 A1* | 4/2022 | Li | G06T 11/006 |
| 2022/0163434 A1 | 5/2022 | Yamaha et al. | |

FOREIGN PATENT DOCUMENTS

| | | |
|---|---|---|
| EP | 3 425 539 A1 | 1/2019 |
| JP | 2013-511406 A | 4/2013 |
| JP | 2017-156271 | 9/2017 |
| JP | 2019-184450 A | 10/2019 |
| JP | 2020-126023 A | 8/2020 |
| WO | WO 2016/052489 A1 | 4/2016 |
| WO | WO 2020/002705 A1 | 1/2020 |
| WO | WO 2020/196855 A1 | 10/2020 |
| WO | WO 2020/244593 A1 | 12/2020 |

OTHER PUBLICATIONS

Extended European Search Report issued Aug. 20, 2024 in European Patent Application No. 21914952.3, 10 pages.

* cited by examiner

IDENTIFICATION DEVICE, IDENTIFICATION METHOD, AND IDENTIFICATION PROGRAM FOR IDENTIFYING FIBER LAYER IN FIBER-REINFORCED MATERIAL

CROSS REFERENCE TO RELATED APPLICATIONS

This application is a continuation application of International Application No. PCT/JP2021/032693, filed on Sep. 6, 2021, which claims priority to Japanese Patent Application No. 2020-218938, filed on Dec. 28, 2020, the entire contents of which are incorporated by reference herein.

TECHNICAL FIELD

The present disclosure relates to an identification device, an identification method, and an identification program for identifying a fiber layer in a fiber-reinforced material.

BACKGROUND ART

Patent Literature 1 discloses a technique of acquiring a moire image by using an X-ray Talbot imaging device for an inspection object, and estimating an evaluation index to determine a quality of the inspection object, based on a two-dimensional reconstructed image generated based on the moire image.

CITATION LIST

Patent Literature

Patent Literature 1: Japanese Patent Laid-Open Publication No. 2019-184450

SUMMARY OF THE INVENTION

Technical Problem

When trying to inspect the orientation of the reinforced fibers inside a structure formed by a so-called fiber-reinforced material, which is a composite of high-strength fibers (reinforced fibers) with a base material (matrix), it is necessary to identify which fiber layer the reinforced fiber to be inspected belongs to. However, when the technique disclosed in Patent Literature 1 is used, it is difficult to automatically identify the fiber layer, and instead, it is necessary for the worker to manually identify the fiber layer. Therefore, the time and cost required for inspecting the orientation of the reinforced fibers are enormous.

More specifically, in a place where a reinforcing material composed of a plurality of fiber layers is bent, such as a bent portion of the structure, it is difficult to improve the accuracy of identification when identifying which fiber layer the fibers contained in the fiber-reinforced material belongs to unless information on a bending direction of the reinforcing material is confirmed. Therefore, there has been a problem that the work of identifying the fiber layer is time-consuming and costly. In addition, there has been a problem that it takes time and cost to train workers who are proficient in the work of identifying the fiber layer.

The present disclosure has been made to solve such a problem. An object of the present disclosure is to provide an identification device, an identification method, and an identification program capable of automating the identification of a fiber layer in a fiber-reinforced material and reducing the time and cost required for inspecting the orientation of the reinforced fiber.

Solution to Problem

Regarding to a fiber-reinforced material formed by deforming a reinforcing material composed of a plurality of fiber layers from an initial shape and molding into a predetermined shape, an identification device according to one aspect of the present disclosure generates a first data in which a physical quantity distribution inside the fiber-reinforced material is mapped to the initial shape. The identification device performs binarization of the first data to generate a second data in which a label identifying the fiber layer is mapped to the initial shape, and maps the second data to a predetermined shape, based on a deformation data.

The binarization may be based on a learning model generated based on teacher data paired with the physical quantity distribution inside the fiber-reinforced material molded in the initial shape and a distribution of the fiber layer.

The binarization may be based on semantic segmentation.

The deformation data may be generated based on a calculation method for expanding the reinforcing material from the predetermined shape to the initial shape.

Regarding to a fiber-reinforced material formed by deforming a reinforcing material composed of a plurality of fiber layers from an initial shape and molding into a predetermined shape, an identification method and an identification program according to one aspect of the present disclosure generate a first data in which a physical quantity distribution inside the fiber-reinforced material is mapped to the initial shape. The identification method and the identification program perform binarization of the first data to generate a second data in which a label identifying the fiber layer is mapped to the initial shape, and map the second data to a predetermined shape, based on a deformation data.

Advantageous Effects of Invention

According to the present disclosure, it is possible to automate the identification of a fiber layer in a fiber-reinforced material and to reduce the time and cost required for inspecting the orientation of the reinforced fiber.

DESCRIPTION OF EMBODIMENTS

Figure 1:
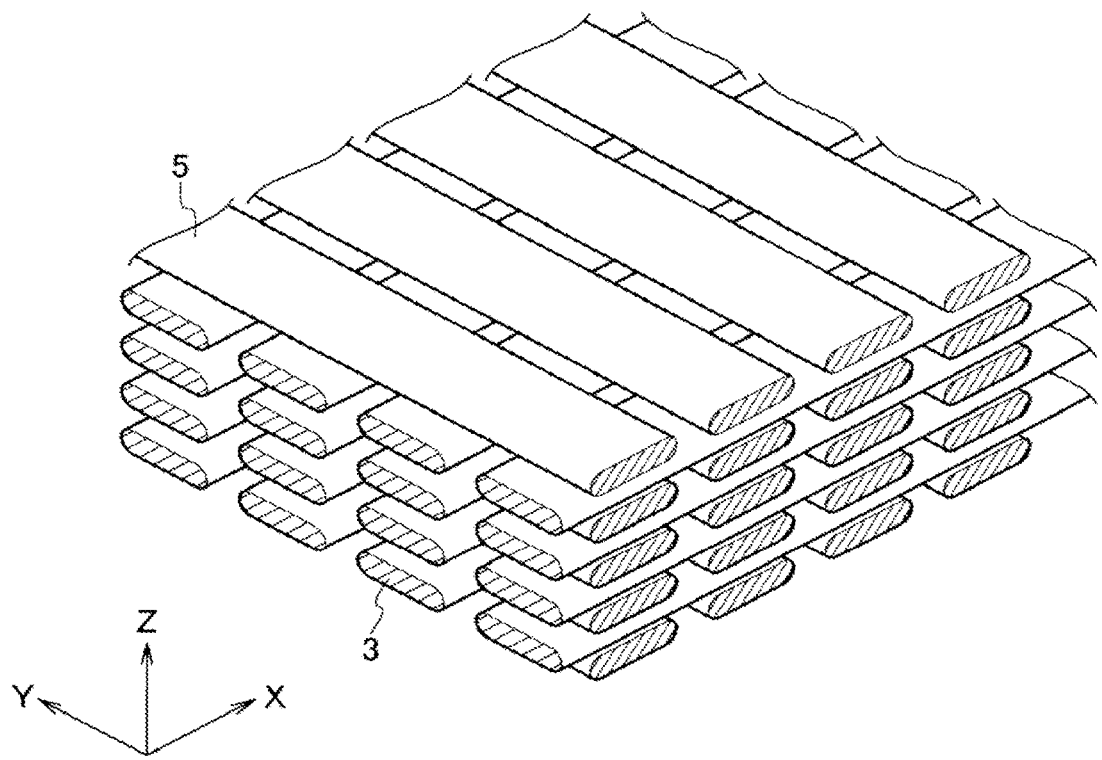
FIG. 1 is a perspective view schematically showing a reinforcing material composed of a plurality of fiber layers.

Hereinafter, some exemplary embodiments will be described with reference to the drawings. In addition, the same reference numerals are given to common parts in each figure, and duplicate description is omitted.

Further, in some figures, X, Y, and Z mean the axial directions in the three-dimensional coordinate system, respectively. Citing these directions throughout the specification and the appended claims is for convenience of explanation only and does not limit embodiments. Moreover, the axial directions are not always orthogonal to each other.

[Aspects of Reinforcing Material in Fiber-Reinforced Material]

A fiber-reinforced material is generally a composite of a reinforcing material made of high-strength fibers (reinforced fibers) and a base material (matrix). For example, the reinforced fiber consists of ceramics such as graphite, boron nitride, or silicon carbide. Alternatively, the reinforced fiber may consist of a resin such as Kevlar, or a suitable metal or alloy. The matrix is a suitable ceramic such as a thermosetting resin, a thermoplastic resin, or silicon carbide. A matrix made of ceramics is particularly called a ceramic-based composite material (CMC).

Mainly referring to FIG. 1, for example, a reinforcing material obtained by three-dimensionally weaving reinforced fibers can be used for the fiber-reinforced material according to the present embodiment. In the reinforcing material, fibers run in the X and Y directions, and these fibers gently restrain each other. According to one example, the fiber bundles 3 and 5 run in the X and Y directions, respectively, and form layers (fiber layers) with each other to bond with each other, thereby forming the reinforcing material composed of a plurality of fiber layers. Of course, above description is only an example, and the fibers may be diagonally woven rather than orthogonal to each other, and the reinforcing material may be two-dimensional, which is not laminated in the thickness direction.

Figure 2:
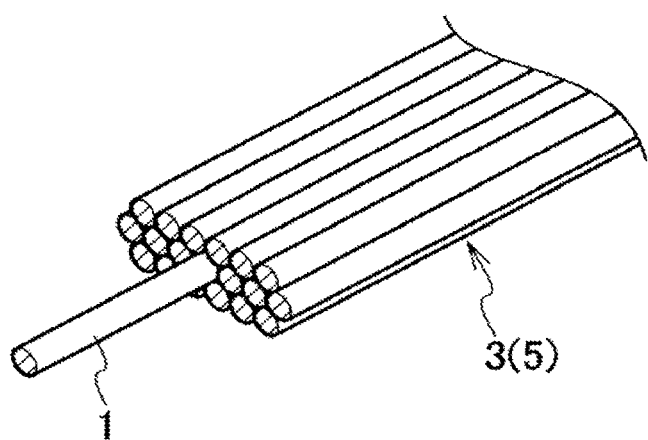
FIG. 2 is a perspective view schematically showing the fiber bundle.

With reference to FIG. 2, each of these fiber bundles 3 and 5 is a bundle of a plurality of reinforced fibers 1 substantially parallel to each other. In the illustrated example, each reinforced fiber 1 is straight, but may be twisted together. One fiber bundle 3 or 5 is, for example, a bundle of 500 to 800 reinforced fibers 1, but the number can be increased or decreased arbitrarily.

The reinforcing material composed of the plurality of fiber layers is formed into a predetermined shape appropriately set from the initial shape by a known molding method such as pressing or bagging. Following or in parallel with molding, a matrix material is impregnated and solidified to form the matrix and produce the fiber-reinforced material. Of course, this is just for convenience of explanation, and various products are manufactured from fiber-reinforced materials.

The distribution and orientation of the fiber layer and the fiber bundle in the fiber-reinforced material can be observed three-dimensionally by using a measuring device capable of observing the inside of the object non-destructively. For example, even if it is optically opaque like CMC, computer tomography using X-rays (X-ray CT) can be used. Alternatively, if it is a fiber-reinforced resin using a transparent resin, it is also possible to use optical means. Of course, instead of or in addition to these, internal observation means using other particles can be used.

Figure 3:
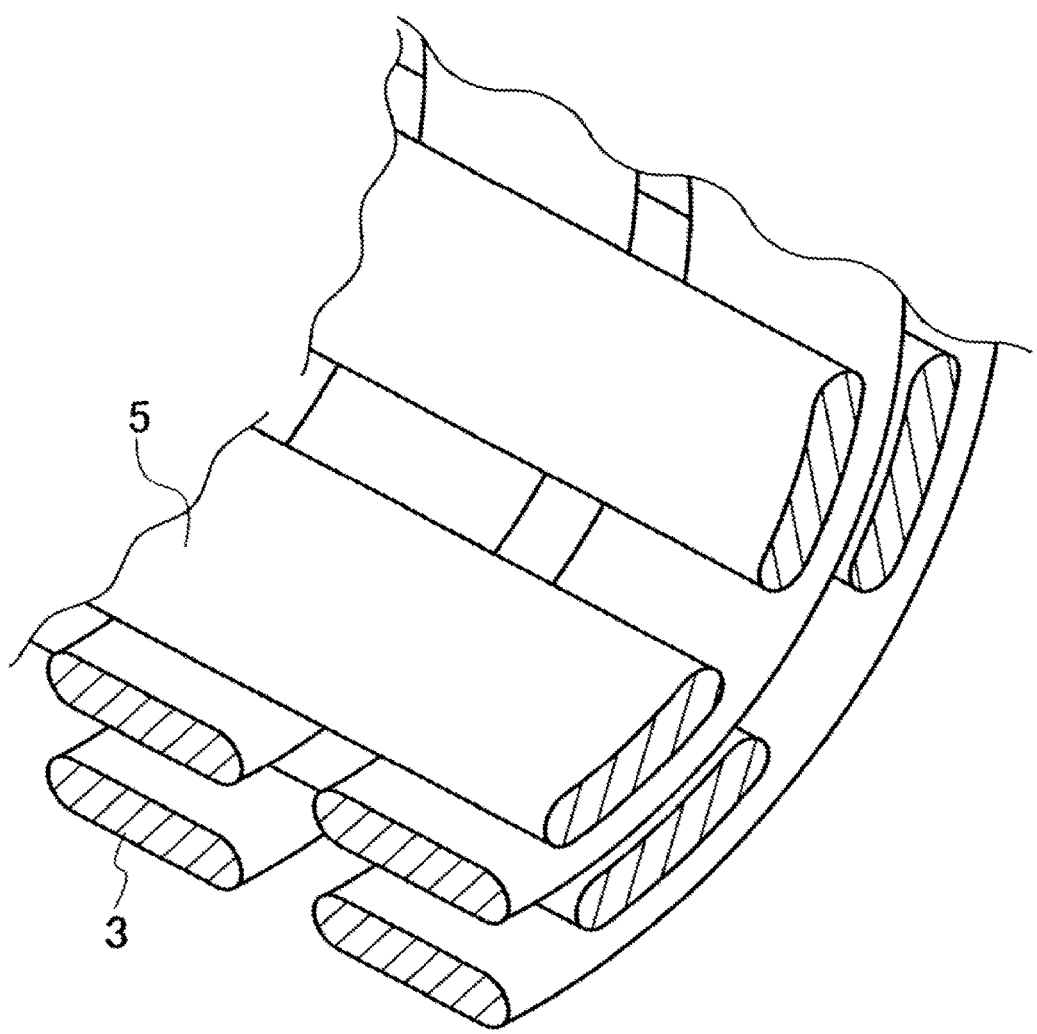
FIG. 3 is a perspective view schematically showing the fiber layer in the bent portion.

As shown in FIG. 3, it is necessary for the reinforcing material to bend in various directions. In this way, at a location formed by bending the reinforcing material composed of a plurality of fiber layers, such as a bent portion of a structure, there will be situations where it is difficult to improve accuracy of identifying which fiber layer the fiber bundle contained in the fiber-reinforced material belongs to. The steeper the bending angle and the more the bending direction increases in a plurality of directions, the more difficult it is to identify the fiber layer to which the fiber bundle of interest belongs.

[Configuration of Identification Device]

Figure 4:
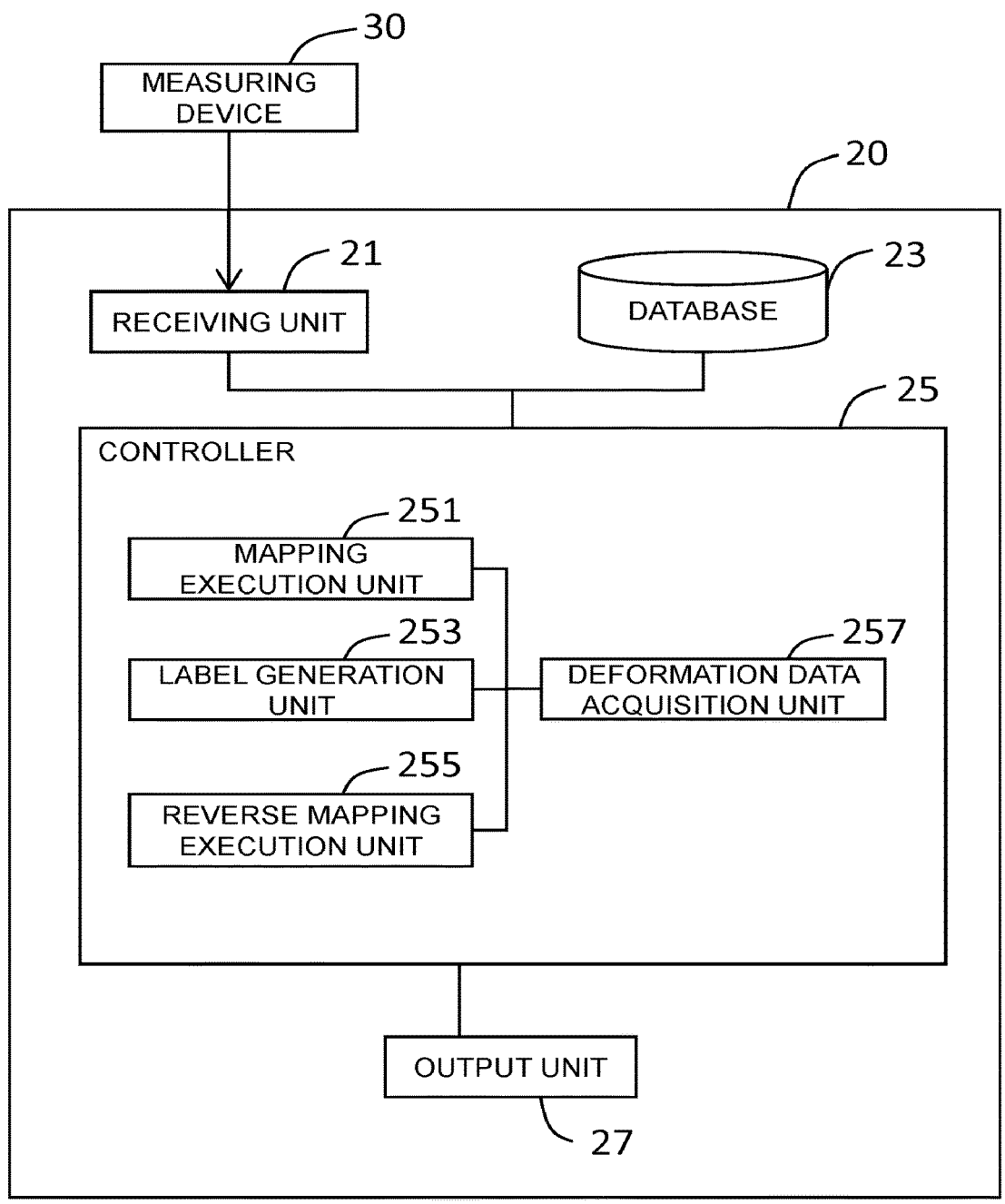
FIG. 4 is a block diagram showing a configuration of an identification device according to an embodiment.

FIG. 4 is a block diagram showing a configuration of the identification device.

As shown in FIG. 4, the identification device 20 includes a receiving unit 21, a database 23, a controller 25, and an output unit 27. The controller 25 is connected so as to be able to communicate with the receiving unit 21, the database 23, and the output unit 27.

In addition, the output unit 27 may be provided by the identification device 20 itself, or may be installed outside the identification device 20 and connected to the identification device 20 by a wireless or wired network.

The receiving unit 21 is connected by a wireless or wired network so as to be able to communicate with the measuring device 30. The receiving unit 21 receives data regarding a physical quantity distribution inside the fiber-reinforced material acquired by the measuring device 30.

The database 23 stores information necessary for binarization performed by a label generation unit 253, which will be described later. For example, when the label generation unit 253 performs binarization using a learning model, the database 23 stores the learning model generated based on a teacher data paired with the physical quantity distribution and a distribution of the fiber layer inside the fiber-reinforced material obtained by directly molding the reinforcing material having a non-bent shape (initial shape).

For example, when focusing on a position inside the fiber-reinforced material, the learning model may be configured to output a label indicating which of the multiple fiber layers composing the reinforcing material the position belongs to, based on the distribution of the physical quantity at and around the position. As an example of the method of labeling each dot belonging to a certain area and performing binarization in this way, there is semantic segmentation.

In addition, the database 23 may store data regarding the physical quantity distribution inside the fiber-reinforced material acquired by the receiving unit 21.

The output unit 27 outputs information generated by the controller 25 described later. In particular, the output unit 27 outputs a label mapped to the predetermined shape of the fiber-reinforced material by the controller 25 to the user or the like, wherein the label identifies any of the plurality of fiber layers constituting the fiber-reinforced material.

For example, the output unit 27 may be a display that presents information to the user by displaying figures and characters by combining a plurality of display pixels, or a speaker that notifies the user of the information by voice. The method of outputting information by the output unit 27 is not limited to the examples given here.

The controller 25 (control unit) is a general-purpose computer including a CPU (central processing unit), a memory, and an input/output unit. A computer program (identification program) for functioning as the identification device is installed in the controller 25. By executing the computer program, the controller 25 functions as a plurality of information processing circuits (251, 253, 255, 257) included in the identification device. The computer program (identification program) may be stored in a storage medium that can be read and written by a computer.

The present disclosure shows an example of realizing the plurality of information processing circuits (251, 253, 255, 257) by software. However, it is also possible to configure the information processing circuits (251, 253, 255, 257) by preparing dedicated hardware for executing each of the following information processing. Further, the plurality of information processing circuits (251, 253, 255, 257) may be configured by individual hardware. Further, the information processing circuit (251, 253, 255, 257) may also be used as a control unit used for monitoring or controlling the measuring device 30.

As shown in FIG. 4, the controller 25 includes a mapping execution unit 251, a label generation unit 253, a reverse mapping execution unit 255, and a deformation data acquisition unit 257 as the plurality of information processing circuits (251, 253, 255, 257).

The deformation data acquisition unit 257 acquires deformation data that associates the predetermined shape of the reinforcing material constituting the fiber-reinforced material with the initial shape of the reinforcing material. Here, the deformation data is, for example, data in which each node of the mesh structure representing the initial shape of the reinforcing material (pre-deformation node) is associated with each node of the mesh structure representing the predetermined shape of the reinforcing material (post-deformation node).

The deformation data acquisition unit 257 may expand the predetermined shape into a flat initial shape based on an existing calculation method for calculating a plane development from a three-dimensional structure, and calculate the deformation data. Further, the deformation data acquisition unit 257 may calculate the deformation data by deformation simulation using the finite element method or the like with reference to the step of deforming the reinforcing material from the initial shape to the predetermined shape when molding the fiber-reinforced material. In addition, the deformation data may be set by the user.

The deformation data acquisition unit 257 may set an analysis target range among the fiber-reinforced material and may calculate the deformation data of the shape of the analysis target range by analyzing the shape of the analysis target range as the predetermined shape. Further, the deformation data acquisition unit 257 may calculate the deformation data for the initial shape specified by the user. In addition, the user may set the deformation data itself.

The mapping execution unit 251 maps the acquired physical quantity distribution to the initial shape based on the deformation data, and generates the first data. Specifically, when the physical quantity at the post-deformation node related to the predetermined shape can be obtained based on the physical quantity distribution, the mapping execution unit 251 refers to the pre-deformation node corresponding to the post-deformation node based on the deformation data, and associates the physical quantity at the post-deformation node with the pre-deformation node referred to and obtained. In this way, the mapping execution unit 251 generates the first data in which the value of the physical quantity is set based on the physical quantity distribution for each of the pre-deformation nodes related to the initial shape.

The label generation unit 253 binarizes the first data and generates a second data in which the label identifying the fiber layer constituting the reinforcing material is mapped to the initial shape. For example, by using the learning model stored in the database 23, the label generation unit 253 associates a label indicating the fiber layer at the position of the pre-deformation node related to the initial shape with the pre-deformation node. In this way, the label generation unit 253 generates the second data in which the label identifying the fiber layer is set for each of the pre-deformation nodes related to the initial shape.

The reverse mapping execution unit 255 maps the label set by the label generation unit 253 to the predetermined shape by mapping the second data to the predetermined shape based on the deformation data. Specifically, when the label associated with the pre-deformation node related to the initial shape can be obtained in the second data, the reverse mapping execution unit 255 refers to the post-deformation node corresponding to the pre-deformation node based on the deformation data, and associates the label of the pre-deformation node with the post-deformation node referred to and obtained. In this way, the reverse mapping execution unit 255 generates data in which a label for identifying the fiber layer is set for each of the post-deformation nodes related to the predetermined shape.

The data generated by the reverse mapping execution unit 255 is output to the outside via the output unit 27.

[Effect of Embodiment]

As described in detail above, regarding to a fiber-reinforced material formed by deforming a reinforcing material composed of a plurality of fiber layers from an initial shape and molding into a predetermined shape, an identification device, an identification method, and an identification program generate a first data in which a physical quantity distribution inside the fiber-reinforced material is mapped to the initial shape. The identification device, the identification method, and the identification program perform binarization of the first data to generate a second data in which a label identifying the fiber layer is mapped to the initial shape, and map the second data to a predetermined shape, based on a deformation data.

As a result, it is possible to automate the identification of a fiber layer in a fiber-reinforced material and to reduce the time and cost required for inspecting the orientation of the reinforced fiber. Further, in a portion formed by bending the reinforcing material composed of a plurality of fiber layers such as a bent portion of a structure, the accuracy of identification when identifying which fiber layer the fiber bundle contained in the fiber-reinforced material belongs to, can be improved.

The binarization may be based on a learning model generated based on teacher data paired with the physical quantity distribution inside the fiber-reinforced material molded in the initial shape and a distribution of the fiber layer. As a result, even at a predetermined shape where the bending direction of the reinforcing material is a complicated, the identification of the fiber layer can be carried out based on the teacher data paired with the physical quantity distribution inside the fiber-reinforced material formed in the initial shape and the distribution of the fiber layer. Therefore, it is not necessary to prepare teacher data corresponding to a complicated predetermined shape, and it is possible to automate the identification of the fiber layer in the fiber-reinforced material having various shapes. As a result, the accuracy of identification of the fiber layer can be improved.

The binarization may be based on semantic segmentation. Thereby, the inside of the fiber-reinforced material whose physical quantity distribution is measured can be classified into a plurality of regions for each fiber layer. As a result, the fiber layer to which the fiber inside the fiber-reinforced material belongs can be easily identified based on the position information of the fiber.

The deformation data may be generated based on a calculation method for expanding the reinforcing material from the predetermined shape to the initial shape. This eliminates the need for the user to separately instruct the correspondence between the predetermined shape and the initial shape during the analysis of the fiber-reinforced material. As a result, it is possible to automate the identification of fiber layers in fiber-reinforced materials having various shapes. As a result, the accuracy of identifying the fiber layer can be improved.

Respective functions described in the present disclosure may be implemented by one or plural processing circuits. The processing circuits include programmed processors, electrical circuits, etc., and include devices such as an application specific integrated circuit (ASIC) and conventional circuit elements that are arranged to execute the functions described in the present disclosure.

According to the present disclosure, it is possible to automate the identification of the fiber layer in the fiber-reinforced material and to reduce the time and cost required for inspecting the orientation of the reinforced fiber. Thus, for example, it is possible to contribute to Goal 12 of the United Nations-led Sustainable Development Goals (SDGs): "Ensure sustainable consumption and production patterns."

It goes without saying that the present disclosure includes various embodiments not described here. Therefore, the technical scope of the present disclosure is defined only by the matters relating to the reasonable claims from the above description.

The invention claimed is:

1. An identification device for a fiber-reinforced material formed by deforming a reinforcing material composed of a plurality of fiber layers from an initial shape and molding into a predetermined shape, including:
    a receiver configured to receive a physical quantity distribution inside the fiber-reinforced material, and
    a controller configured to identify, for a specific fiber contained in the fiber-reinforced material, which one of the plurality of fiber layers contains the specific fiber, based on the physical quantity distribution, wherein
    the controller is configured
        to generate a first data in which the physical quantity distribution is mapped to the initial shape based on a deformation data that associates the initial shape with the predetermined shape,
        to perform binarization of the first data to generate a second data in which a label identifying which one of the plurality of fiber layers contains the specific fiber is mapped to the initial shape, and
        to map the label to the predetermined shape by mapping the second data to the predetermined shape based on the deformation data, wherein the mapping of the second data enables automated identification of fiber layers in bent portions of the fiber-reinforced material.

2. The identification device according to claim 1, wherein the binarization is based on a machine learning model generated based on training data, wherein the training data comprises pairs of: (i) the physical quantity distribution inside the fiber-reinforced material molded in the initial shape, and (ii) a distribution of the fiber layer corresponding to the physical quantity distribution.

3. The identification device according to claim 1, wherein the binarization is based on semantic segmentation to classify inside of the fiber-reinforced material into regions corresponding to each of the plurality of fiber layers.

4. The identification device according to claim 1, wherein the deformation data is generated based on a calculation method for expanding the reinforcing material from the predetermined shape to the initial shape.

5. An identification method for identifying, for a specific fiber contained in a fiber-reinforced material, which one of a plurality of fiber layers contains the specific fiber, based on a physical quantity distribution inside the fiber-reinforced material wherein the fiber-reinforced material is formed by deforming a reinforcing material composed of the plurality of fiber layers from an initial shape and molding into a predetermined shape, the method comprising:
    generating a first data in which the physical quantity distribution is mapped to the initial shape based on a deformation data that associates the initial shape with the predetermined shape,
    performing binarization of the first data to generate a second data in which a label identifying which one of the plurality of fiber layers contains the specific fiber is mapped to the initial shape, and
    mapping the label to the predetermined shape by mapping the second data to the predetermined shape based on the deformation data, wherein the mapping of the second data enables automated identification of fiber layers in bent portions of the fiber-reinforced material.

6. A computer program product comprising a non-transitory computer-readable storage medium storing computer instructions which, when executed by a computer, cause the computer to perform a method of identifying, for a specific fiber contained in a fiber-reinforced material, which one of a plurality of fiber layers contains the specific fiber, based on a physical quantity distribution inside the fiber-reinforced material wherein the fiber-reinforced material is formed by deforming a reinforcing material composed of the plurality of fiber layers from an initial shape and molding into a predetermined shape,
    the method comprising:
    generating a first data in which the physical quantity distribution is mapped to the initial shape based on a deformation data that associates the initial shape with the predetermined shape,
    performing binarization of the first data to generate a second data in which a label identifying which one of the plurality of fiber layers contains the specific fiber is mapped to the initial shape, and
    mapping the label to the predetermined shape by mapping the second data to the predetermined shape based on the deformation data, wherein the mapping of the second data enables automated identification of fiber layers in bent portions of the fiber-reinforced material.

* * * * *